United States Patent Office

3,420,799
Patented Jan. 7, 1969

3,420,799
PROCESS FOR PREPARING AMINOPLASTS FROM ALKOXYACETALDEHYDE WITH AN AZINE
Stanley B. Cavitt, Santa Clara, Tex., assignor to Jefferson Chemical Company, Inc., Houston, Tex., a corporation of Delaware
No Drawing. Filed June 29, 1966, Ser. No. 561,356
U.S. Cl. 260—67.6                        7 Claims
Int. Cl. C08g 9/10; C08g 9/28; C08g 9/12

ABSTRACT OF THE DISCLOSURE

A one-step process for preparing aminoplasts which comprises reacting an alkoxyacetaldehyde with an azine such as urea, cyclic ethylene urea, a dicyandiamide or an aminotriazine in solution in a polar solvent.

---

This invention relates to aminoplasts. More particularly, this invention relates to aminoplasts from alkoxyacetaldehydes.

Aminoplasts derived from urea, cyclic ethyleneureas, dicyandiamides, aminotriazines, etc., are widely used for variety of purposes. Thus, they are used as components of baking enamels, in the preparation of textile treating agents, molding powders, lubricants, etc. One of the problems encountered in the utilization of aminoplasts is their comparative insolubility. It has been proposed to overcome this problem in the past by reacting an aliphatic alcohol such as butanol with an aminoplast derived from an aldehyde and an azine compound such as those mentioned above. Although significant improvement has been obtained, there is much to be desired, particularly with respect to the processing costs, since two separate reactions are involved. In addition, improvement of the solubility characteristics is also desirable.

It has now been discovered in accordance with the invention that these and related problems can be overcome through aminoplasts prepared by a one-step process involving the reaction of an alkoxyacetaldehyde with an azine such as urea, cyclic ethylene ureas, a dicyandiamide or an aminotriazine.

The starting materials for the present invention are alkoxyacetaldehydes and azides. The alkoxyacetaldehydes that are used in accordance with the present invention are the lower alkoxyacetaldehydes such as methoxyacetaldehyde, ethoxyacetaldehyde, propoxyacetaldehyde and butoxyacetaldehydes.

The azides starting material, as indicated, may be urea or a urea containing one or two substituent groups on the nitrogen atom such as N-methylurea, N,N'-dimethylurea, etc. Another suitable class of starting materials are the cyclic ethylene ureas having the following formula:

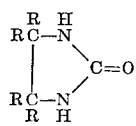

wherein R represents H, a $C_1$ to $C_4$ alkyl group, a $C_1$ to $C_{12}$ aryl group such as ethyleneurea, 3-methylethylene urea, 1,3-dimethylethylene urea, 3-ethylethylene urea, 3-phenyl ethylene urea, etc. Another suitable class of azines are the cyclic 1,3,5-triazines such as melamine, guanamines, ammelines, etc. Among the melamine type compounds that can be used with good results are compounds such as melamine itself, 2-chloro-4,6-diamino-1,3,5-triazine, 6-methyl-2,4-diamino - 1,3,5 - triazine or 2,4,6-triethyl-1,3,5-triazine. Alkaryl or arylalkyl guanamines may also be employed such as, for example, guanamine, benzoguanamine, acetoguanamine, phenylacetoguanamine, phenylpropionoguanamine, tolylacetoguanamine, 2-(o-chlorophenyl) - methylguanamine, 2-phenylmethyl - 4,6-dimethylaminoguanamine, 1,3,5 - triazine o - tolylguanamine, o-xylylguanamine, etc., and mixtures thereof.

The reaction between the alkoxyacetaldehyde and the triazine occurs noncatalytically and is preferably conducted in solvent solution in a polar solvent. Preferably, the organic solvent is an aliphatic alcohol containing an alkyl group corresponding to the alkyl group of the alkoxyacetaldehyde. Thus, a preferred solvent when the feedstock is methoxyacetaldehyde is methanol. While ethanol is preferably used with ethoxyacetaldehyde, etc., aqueous alcoholic solvents or even water, per se, may be used.

The mol ratio of alkoxyacetaldehyde to triazine compounds may be varied within comparatively wide limits. In general, however, at least one mol of alkoxyacetaldehyde is employed per mol of azine. The reaction is suitably conducted at a temperature within the range of about 20° to about 150° C., and more preferably a temperature of less than about 70° such as a temperature within the range of about 20–70° C.

This invention will be illustrated by the following specific examples which are given by way of illustration and not as limitations on the scope of this invention. Where parts are given they are parts by weight.

EXAMPLE I

Reaction of methoxyacetaldehyde with melamine
(3:1 molar ratio)

To a 1,000 ml. flask equipped with a stirrer, thermometer and condenser were added 126 g. (1.0 mol) of powdered melamine and 280 g. (3.0 mols) of 80% aqueous, methanolic methoxyacetaldehyde. The mixture was stirred with heating to ~70° C., at which point an exothermic reaction began. The temperature rose to 90–95° C. as the white slurry slowly changed to a clear solution. The viscosity of the solution began to increase rapidly as the reaction subsided and cooling began.

The total reaction and heating time was one hour. After cooling in contact with air, the product became brittle and crumbled to a white, granular material. The dried condensation polymer began to decompose at 195° C. with gas evolution and was found to contain 26.81% nitrogen. A condensation product of melamine and methoxyacetaldehyde in a 1:3 ratio with elimination of 2 mols of water was calculated to have a theoretical nitrogen content of 26.9%.

EXAMPLE II

Reaction of methoxyacetaldehyde with melamine
(6:1 ratio)

A second experiment was performed using melamine and methoxyacetaldehyde in a 1:6 molar ratio. The white slurry was stirred vigorously as heat was applied by means of a steam bath. At 40–50° C. a significant exothermic heating effect was noted. After removing the steam bath, the solution temperature rose to 60–65° C. Further heating to 70–75° C. was necessary to remove the remaining turbidity to give a clear solution. In this latter temperature range, a slight yellowing effect was noted. The solution was then stripped under aspirator vacuum to ~50° C. to remove some of the excess methoxyacetaldehyde, water and methanol. The polymer solution was observed to be unchanged after standing for several weeks. It was then diluted with methanol, treated with charcoal, heated and filtered through charcoal to give a clear solution containing ~25% condensation polymer. Several microscope slides were dipped in the polymer solution and allowed to dry.

Evaporation of the solvent gave a clear, colorless film which formed a hard coating after heating 16 hours at 60° C. Heating at 160° C. gave a harder film but also produced a golden-yellow color. A sample of solid polymer was precipitated from the alcoholic solution by the addition of water, and then was filtered and dried in vacuo. The polymer had an osmometer molecular weight of 780 and a decomposition point of ~130° C. (gas evolution). The nitrogen content was 25.3%, corresponding to a theoretical value of 25.4% for a condensation polymer formed by the reaction of methoxyacetaldehyde and melamine in a 3:1 molar ratio with elimination of one mol of water.

EXAMPLE III

Reaction of urea with methoxyacetaldehyde
(1:1 molar ratio)

To a 1,000 ml. flask equipped with a stirrer, thermometer, condenser and Dean-Stark trap were added 272 g. (3.0 mols) of 81.8% aqueous, methanolic methoxyacetaldehyde and 180 g. (3.0 mols) of powdered urea in small portions. As soon as a uniform slurry had been achieved by stirring, the mixture was heated up rapidly with a heating mantle. As the pot temperature reached 60–70° C., a strongly exothermic reaction began, raising the temperature of the flask contents to 90–100° C. Moderate cooling was necessary to keep the reaction temperature below 100° C. The slurry became nearly clear and homogeneous before the reaction temperature reached its peak, and then rapidly changed to a white slurry and finally to a solid white cake which stopped the stirrer. The white solid was allowed to cool, then chipped up and ground in a mortar. The white, grainy polymer had a consistency and appearance similar to that of detergent flakes and was insoluble in water and acetone. There was recovered 410 g. of polymer which, after drying at 57° C. in vacuo, had a melting point of 205–210° C. (red melt with decomposition). Infrared analysis indicated that the general structural characteristics of the condensation polymer were those of a urea-type amide containing methoxyl groups. Some primary and/or secondary amine (possibly some —OH) bands were observed around $3.0\mu$, possibly some secondary and tertiary amide at $6.4\mu$, and primary amide at $6.2\mu$. The methoxyl group was confirmed by absorption bands in the 8.3 and $9.1\mu$ regions.

The total nitrogen content was 23.59%. Available evidence indicated that the polymer was a urea-aldehyde polymer in structural features except for the presence of methoxyl groups.

EXAMPLE IV

Reaction of urea with methoxyacetaldehyde
(1:4 molar ratio)

Another polymer sample was prepared in a similar manner, except a 1:4 molar ratio of urea:methoxyacetaldehyde was employed. The polymer obtained from this reaction had a consistency and appearance very similar to that of high vacuum lubricant. The urea-methoxyacetaldehyde polymer had an odor of methoxyacetaldehyde, produced a non-penetrating, greasy film on paper and appeared to be insoluble (in this form) in all the common solvents. A sample dried by heating turned brown, probably due to unreacted methoxyacetaldehyde. The infrared data for this condensation polymer were essentially identical to those recorded for the polymer prepared in Example I. All available evidence indicated a substituted urea structure containing methoxyl groups.

Having thus described my invention what is claimed is:

1. A method for the preparation of an aminoplast which comprises reacting an alkoxyacetaldehyde containing 1 to 4 carbons in the alkyl group with a member selected from the group consisting of urea, ethylene ureas, dicyandiamides and aminotriazines in solution in a polar solvent.

2. A method as in claim 1 wherein the alkoxyacetaldehyde is reacted with an aminotriazine.

3. A method as in claim 1 wherein the alkoxyacetaldehyde is reacted with urea.

4. A method for preparing an aminoplast which comprises the steps of reacting melamine with an alkoxyacetaldehyde containing 1 to 4 carbon atoms in the alkyl group in solution in an alkanol having an alkyl group corresponding to the alkoxy group of the alkoxyacetaldehyde in the molar ratio of from about 0.5 to 6 mols of alkoxyacetaldehyde per mol of melamine.

5. A method as in claim 4 wherein the alkoxyacetaldehyde is methoxyacetaldehyde.

6. A method which comprises the steps of reacting urea with an alkoxyacetaldehyde containing from 1 to 4 carbon atoms in the alkyl group in solution in a polar organic solvent in the molar ratio of from about 1 to 4 mols of alkoxyacetaldehyde per mol of urea.

7. A method as in claim 6 wherein the alkoxyacetaldehyde is methoxyacetaldehyde.

No references cited.

WILLIAM H. SHORT, *Primary Examiner.*

T. PERTILLA, *Assistant Examiner.*

U.S. Cl. X.R.

260—68